United States Patent
Abraham et al.

(10) Patent No.: US 8,832,718 B2
(45) Date of Patent: Sep. 9, 2014

(54) METHOD AND APPARATUS FOR PROVIDING AN INTERFACE BETWEEN APPLICATION SOFTWARE AND A SATELLITE POSITIONING SYSTEM SUB-SYSTEM IN A LOCATION ENABLED DEVICE

(75) Inventors: Charles Abraham, Los Gatos, CA (US); Sergei Podshivalov, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2225 days.

(21) Appl. No.: 11/206,315

(22) Filed: Aug. 17, 2005

(65) Prior Publication Data

US 2007/0044109 A1    Feb. 22, 2007

(51) Int. Cl.
  *G06F 9/44*  (2006.01)
  *G06F 13/10*  (2006.01)
  *G01S 19/00*  (2010.01)

(52) U.S. Cl.
  CPC ................... *G06F 13/102* (2013.01)
  USPC .......................................... 719/321; 342/457

(58) Field of Classification Search
  USPC ........................................ 719/321; 342/357
  See application file for complete search history.

(56) References Cited

U.S. PATENT DOCUMENTS

| | | | |
|---|---|---|---|
| 7,233,280 B2* | 6/2007 | Mor et al. | 342/357.55 |
| 7,463,980 B2* | 12/2008 | Hoiness et al. | 701/213 |
| 7,778,244 B1* | 8/2010 | Sheikh et al. | 370/363 |
| 2003/0017834 A1* | 1/2003 | Pratt | 455/456 |
| 2003/0120424 A1* | 6/2003 | Angwin et al. | 701/213 |
| 2003/0195925 A1* | 10/2003 | Kaneko et al. | 709/203 |
| 2003/0199260 A1* | 10/2003 | Casey et al. | 455/150.1 |
| 2003/0222819 A1* | 12/2003 | Karr et al. | 342/457 |
| 2003/0224855 A1* | 12/2003 | Cunningham | 463/41 |
| 2004/0198386 A1* | 10/2004 | Dupray | 455/456.1 |
| 2005/0049765 A1* | 3/2005 | Chetia et al. | 701/29 |
| 2005/0240345 A1* | 10/2005 | Yamamoto et al. | 701/213 |

OTHER PUBLICATIONS ("Access to the EGNOS Signal in Space Over Mobile-IP", Ruizhi et al, 2003, 7 pages.*

* cited by examiner

*Primary Examiner* — Andy Ho
*Assistant Examiner* — Abdou Seye
(74) *Attorney, Agent, or Firm* — Sterne, Kessler, Goldstein & Fox P.L.L.C.

(57) ABSTRACT

Method and apparatus for providing an interface between application software and an SPS sub-system embedded in a location-enabled device is described. In one example, the location-enabled device includes a satellite positioning system (SPS) receiver, a hardware communication port coupled to the SPS receiver, a central processing unit (CPU), and a memory. The memory stores program code for execution by the CPU. The program code includes application software, SPS control software, and a driver. The application software is configured to communicate using the hardware communication port. The SPS control software is configured to control the SPS receiver. The driver is configured to provide a virtual communication port between the application software and the SPS control software.

20 Claims, 2 Drawing Sheets

METHOD AND APPARATUS FOR PROVIDING AN INTERFACE BETWEEN APPLICATION SOFTWARE AND A SATELLITE POSITIONING SYSTEM SUB-SYSTEM IN A LOCATION ENABLED DEVICE

BACKGROUND OF THE INVENTION

1. Field of the Invention

The present invention relates to satellite positioning system (SPS) devices and, more particularly, to a method and apparatus for providing an interface between application software and an SPS sub-system in a location enabled device.

2. Description of the Background Art

Satellite Positioning System (SPS) receivers use measurements from several satellites to compute position. SPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. Exemplary satellite positioning systems include the Global Positioning System (GPS), the European GALILEO system, and the Russian GLONASS system.

In GPS, each signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges," since they are known modulo the 1 millisecond PN frame boundaries. If the data bit edges are identified for a particular satellite, then the pseudorange is known modulo the data bit period, for example, 20 ms in the current GPS system. Different satellite navigation systems, and future changes in the GPS system may give different data bit periods. In general, if a pseudorange is known modulo N ms, then we refer to it as a "fractional pseudorange". By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Presently, SPS receivers are being embedded within various types of mobile devices to provide "location-enabled" devices. For example, SPS receivers are being embedded within cellular telephones, personal digital assistants (PDAs), laptop computers, pagers, and the like. In general, the location-enabled device includes a central processing unit (CPU) for controlling the functionality of the device (e.g., wireless communication in a cellular telephone), as well as run various types of application software (e.g., navigation software). Typically, an embedded SPS sub-system (the SPS receiver and its control software) makes use of the CPU in the location enabled device. In particular, the control software for the SPS receiver is executed by the CPU. This saves power and obviates the need for an additional processor device for the SPS sub-system.

Most application software related to SPS location is designed to communicate with an external SPS receiver via an address to a standard hardware communication port. For example, some application software is designed to send and receive data via a universal asynchronous receiver transmitter (UART). The application software may directly interface with the external SPS receiver since the external SPS receiver is typically designed as a stand-alone device. This is not the case, however, if the SPS system is embedded within a location-enabled device, as described above. Notably, an embedded SPS receiver is designed to interface with its control software, which is running on the CPU of the location-enabled device. The application software must interface with the SPS control software. However, the application software is designed to look for the SPS control software at a hardware communication port, and does not expect the SPS control software to be running on the same CPU. Accordingly, there exists a need in the art for a method and apparatus for providing an interface between application software and an SPS sub-system embedded in a location-enabled device.

SUMMARY OF THE INVENTION

Method and apparatus for providing an interface between application software and an SPS sub-system embedded in a location-enabled device is described. In one embodiment, the location-enabled device includes a satellite positioning system (SPS) receiver, a hardware communication port coupled to the SPS receiver, a central processing unit (CPU), and a memory. The memory stores program code for execution by the CPU. The program code includes application software, SPS control software, and a driver. The application software is configured to communicate using the hardware communication port. The SPS control software is configured to control the SPS receiver. The driver is configured to provide a virtual communication port between the application software and the SPS control software.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

A method and apparatus for providing an interface between application software and a satellite positioning system (SPS)

sub-system in a location enabled device is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing SPS satellite signals.

Figure 1:
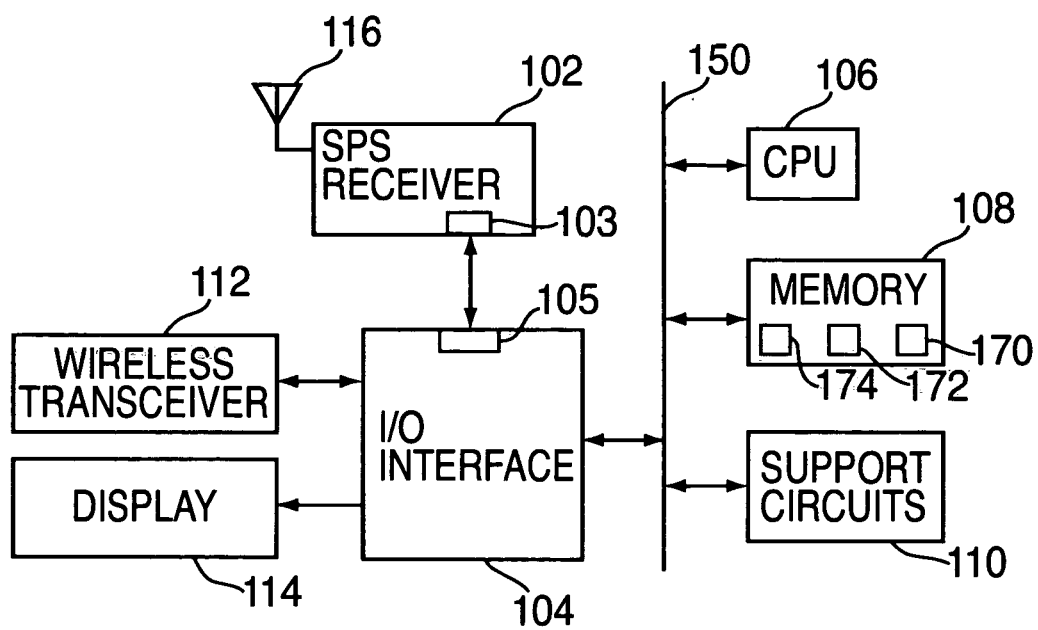
FIG. 1 is a block diagram depicting an exemplary embodiment of a location-enabled device constructed in accordance with one or more aspects of the invention.

FIG. 1 is a block diagram depicting an exemplary embodiment of a location-enabled device 100 constructed in accordance with one or more aspects of the invention. The location-enabled device 100 includes an SPS receiver 102, an input/output (I/O) interface 104, a central processing unit (CPU) 106, a memory 108, and support circuits 110. The I/O interface 104, the CPU 106, the memory 108, and the support circuits 110 are coupled to a bus 150. The I/O interface 104 includes a communications transceiver 105, such as a universal asynchronous receiver transmitter (UART), a serial peripheral interface (SPI) transceiver, an inter-IC ($I^2C$) transceiver, parallel transceiver, or like type communication transceiver device known in the art. The location-enabled device 100 may include additional conventional elements in communication with the I/O interface 104, such as a wireless transceiver 112 and/or a display 114.

The SPS receiver 102 may comprise a conventional satellite signal receiver, such as a GPS receiver, a GLONASS receiver, or a GALILEO receiver. An exemplary GPS receiver is described in commonly-assigned U.S. Pat. No. 6,453,237, issued Sep. 17, 2002, which is incorporated by reference herein in its entirety. The SPS receiver 102 is coupled to an antenna 116 for receiving SPS signals. The SPS receiver 102 is configured to process the SPS satellite signals to produce satellite measurements, such as pseudorange measurements. Operation of the SPS receiver 102 to produce pseudorange measurements in well-known in the art. The SPS receiver 102 includes an interface 103 in communication with the communications transceiver 105 of the I/O interface 104. For example, the interface 103 may be a UART interface, an SPI interface, an $I^2C$ interface, a parallel interface, or like type interface known in the art.

The CPU 106 may comprise a microprocessor or like type processing element known in the art. The memory 108 may be random access memory, read only memory, removable storage, hard disc storage, or any combination of such memory devices. The support circuits 110 include conventional cache, power supplies, clock circuits, data registers, input devices, output devices, and the like to facilitate operation of the location-enabled device 110. The CPU 106 is configured to communicate with the I/O interface 104, the support circuits 110, and the memory 108 via the bus 150. The wireless transceiver 112 is coupled to an antenna 118 for receiving wireless communication signals (e.g., cellular telephone signals). The display 114 is configured to display data to a user, such as text data, graphical data, or a combination of text and graphical data.

The memory 108 is configured to store software to control operation of the location-enabled device 100. Notably, the memory 108 may store application software 170, an SPS program 172, and a driver program 174. The memory 108 may also store an operating system, which may be OS/2, Java Virtual Machine, Linux, Solaris, Unix, Windows, Windows95, Windows98, Windows NT, and Windows2000, WindowsME, and WindowsXP, among other known platforms. The application software 170 may include one or more application programs configured for execution by the CPU 106, such as emergency assistance programs (e.g., E911), navigation programs (e.g., point-to-point navigation, business finders, real-time traffic information), location-based games, and the like. The SPS program 172 is configured for execution by the CPU 106 to control communications with the SPS receiver 102, provide position computation functionality, handle assistance data received by the wireless transceiver 112, and like type SPS-related functions. The SPS receiver 102 and the SPS program 172 comprise an SPS sub-system for the location-enabled device 100. The driver program 174 is configured to provide a software interface between the application software 170 and the SPS sub-system.

Figure 2:
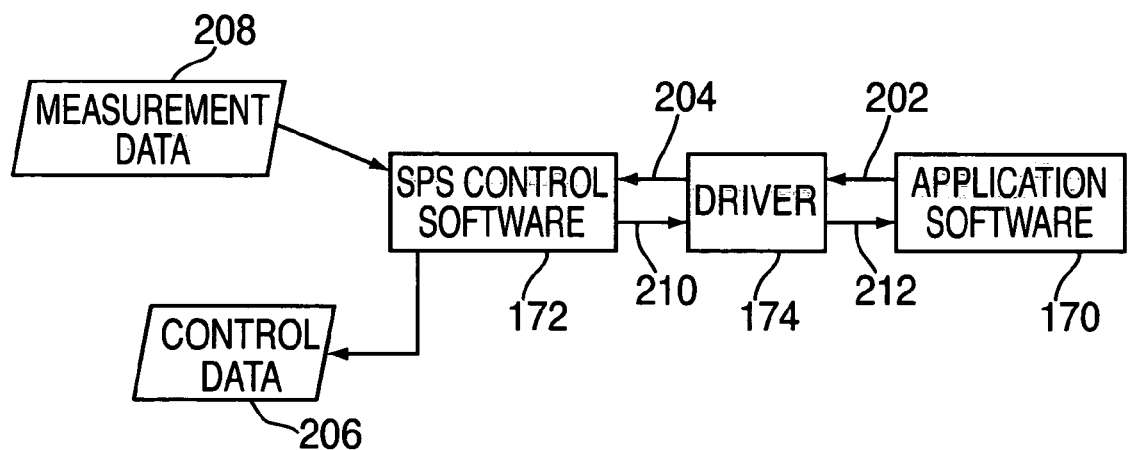
FIG. 2 is a data flow diagram depicting an exemplary embodiment of an interface between application software and an SPS sub-system in accordance with one or more aspects of the invention.

In particular, FIG. 2 is a data flow diagram depicting an exemplary embodiment of an interface between the application software 170 and the SPS sub-system in accordance with one or more aspects of the invention. In the present example, the application software 170 is configured to communicate with an SPS receiver via a UART interface. For example, the application software 170 may comprise third-party commercial navigation software that has been programmed to send and receive data to an address associated with a UART interface. The application software 170 is designed to communicate with an external SPS system that is independent from the processor that executes the application software 170. However, as described above, the SPS receiver 102 is embedded within a location-enabled device 100 that is controlled by the CPU 106. The software for controlling the SPS receiver 102 (i.e., the SPS program 172) is executed by the same CPU as the application software 170.

In this "shared" configuration, the driver program 174 is provided to interface the application software 170 with the SPS program 172. Notably, the driver program 174 provides a "virtual communication port" with which the application software 170 may seamlessly communicate. In other words, viewed from the application software 170, the driver program 174 looks like a hardware communication port (e.g., a UART). As such, the application software 170 does not need to be re-designed to operate in the shared environment of the location-enabled device 100.

In particular, the application software 170 may send control data to the driver program 174 via path 202 using a standard address for a hardware communication port (e.g., COM 9 for a UART). For example, the control data may be a request for position. In other embodiments, the control data is a request to open a port, e.g., port 7, where such a request activates the GPS receiver. The driver program 174 intercepts the control data at the address. Rather than send the control data to a hardware communication port, the driver program 174 relays the control data to the SPS program 172 via path 204. The SPS program 172 may send control data 206 to the SPS receiver 102 via a hardware communication. port (e.g., the communications transceiver 105). In the reverse direction, the SPS program 172 may collect measurement data 208 from the SPS receiver 102 via the hardware communication port (e.g., the communications transceiver 105). The SPS program 172 processes the measurement data 208 to compute position data. The SPS program 172 sends the position data to the driver program 174 via path 210. The driver program 174 relays the position data to the application software 170 via a path 212 using the standard hardware communication port address through which the application software 170 expects to receive the position data.

In an alternative embodiment, a single virtual port may be shared by a plurality of applications. The data at the virtual port may be duplicated for use by any number of simultaneously executing applications. In contrast, for a hardware port, only a single application uses a port at any given time.

A method and apparatus for providing an interface between application software and a satellite positioning system (SPS)

sub-system in a location enabled device is described. In one embodiment, the control software for the SPS sub-system and the application software are executed by the same CPU. The application software is designed to send and receive data to an address corresponding to a hardware communication port (e.g., COM 9 associated with a UART). A driver provides a virtual communications port for the application software such that the application software can continue to send and receive data to the hardware communication port address. Rather than interfacing with the hardware communication port, the driver interfaces with the control software of the SPS subsystem.

While the foregoing is directed to illustrative embodiments of the present invention, other and further embodiments of the invention may be devised without departing from the basic scope thereof, and the scope thereof is determined by the claims that follow.

What is claimed is:

1. A location-enabled device comprising:
   a satellite positioning system (SPS) receiver;
   a hardware communication port coupled to the SPS receiver;
   a central processing unit (CPU) coupled to the hardware communication port; and
   a memory comprising program code stored therein for execution by the CPU, the program code comprising:
      application software configured to address data for transmission to the hardware communication port to communicate with the SPS receiver;
      a driver configured to intercept the data addressed to the hardware communication port: and
      SPS control software configured to receive the intercepted data and control communication between the application software and the SPS receiver.

2. The device of claim 1, wherein the hardware communication port is one of a universal asynchronous transmitter receiver (UART), a serial peripheral interface (SPI) transceiver, and an inter-IC (I²C) transceiver.

3. The device of claim , further comprising:
   a wireless transceiver configured to communicate via a cellular communication network.

4. The device of claim 3, wherein the SPS control software is further configured to handle assistance data received by the wireless transceiver.

5. The device of claim 1, wherein the SPS control software is further configured to receive measurement data from the SPS receiver and provide control data to the SPS receiver.

6. The device of claim 1, wherein the program code further comprises an operating system configured to provide a graphical user interface on the device.

7. The device of claim 1, wherein the application software is further configured to provide real-time traffic information.

8. The device of claim 1, wherein the application software is further configured to provide point-to-point navigation.

9. The device of claim 1, wherein the SPS control software is further configured to interface the hardware communication port.

10. The device of claim 1, wherein the application software comprises a location-based game.

11. A method of interfacing application software with a satellite positioning system (SPS) sub-system embedded in a location-enabled device, the method comprising:
    addressing, by the application software, control data for transmission to a hardware communication port;
    intercepting, by a driver, the control data addressed to the hardware communication port;
    relaying, by the driver, the intercepted control data to SPS control software of the SPS sub-system, the SPS control software configured to control communication between the application software and an SPS receiver of the SPS sub-system; and
    sending the control data, by the SPS control software, to the SPS receiver via the hardware communication port.

12. The method of claim 11, wherein the hardware communication port is one of a universal asynchronous transmitter receiver (UART), a serial peripheral interface (SPI) transceiver, an inter-IC (I²C) transceiver, and a parallel transceiver.

13. The method of claim 11, further comprising:
    providing, by the driver, a software interface between the application software and the SPS control software.

14. The method of claim 11, further comprising:
    receiving, by a wireless transceiver, assistance data from a cellular communication network.

15. The method of claim 14, further comprising:
    handling, by the SPS control software, the assistance data received by the wireless transceiver.

16. The method of claim 11, further comprising:
    collecting, by the SPS control software, measurement data from the SPS receiver; and
    providing, via the driver, the measurement data to the application software.

17. A method of interfacing application software with a satellite positioning system (SPS) sub-system embedded in a location-enabled device, the method comprising:
    sending measurement data from an SPS receiver of the SPS sub-system to SPS control software via a hardware communication port;
    computing position data from the measurement data;
    sending the position data to driver software;
    relaying, by the driver software, the position data to an address associate with the hardware communication port; and
    receiving the position data at the application software,
    wherein the SPS control software is configured to control communication between the application software and the SPS receiver, the application software is configured to address data for transmission to the hardware communication port to communicate with the SPS receiver, and the driver is configured to intercept the data addressed to the hardware communication port.

18. The method of claim 17, wherein the hardware communication port is one of a universal asynchronous transmitter receiver (UART), a serial peripheral interface (SPI) transceiver, an inter-IC (I²C) transceiver, and a parallel transceiver.

19. The method of claim 17, further comprising:
    receiving, by a wireless transceiver, assistance data from a cellular communication network.

20. The method of claim 19, further comprising:
    handling, by the SPS control software, the assistance data received by the wireless transceiver.

* * * * *

UNITED STATES PATENT AND TRADEMARK OFFICE
CERTIFICATE OF CORRECTION

PATENT NO. : 8,832,718 B2
APPLICATION NO. : 11/206315
DATED : September 9, 2014
INVENTOR(S) : Abraham et al.

Page 1 of 1

It is certified that error appears in the above-identified patent and that said Letters Patent is hereby corrected as shown below:

In the Claims

Column 5, line 40, please replace "device of claim ," with --device of claim 1,--.

Column 6, line 49, please replace "the driver is configured" with --the driver software is configured--.

Signed and Sealed this
Sixth Day of January, 2015

Michelle K. Lee
*Deputy Director of the United States Patent and Trademark Office*